Aug. 21, 1956   W. P. OEHLER ET AL   2,759,311
STABILIZING MEANS FOR DISK HARROWS
Filed Dec. 1, 1953   2 Sheets-Sheet 2
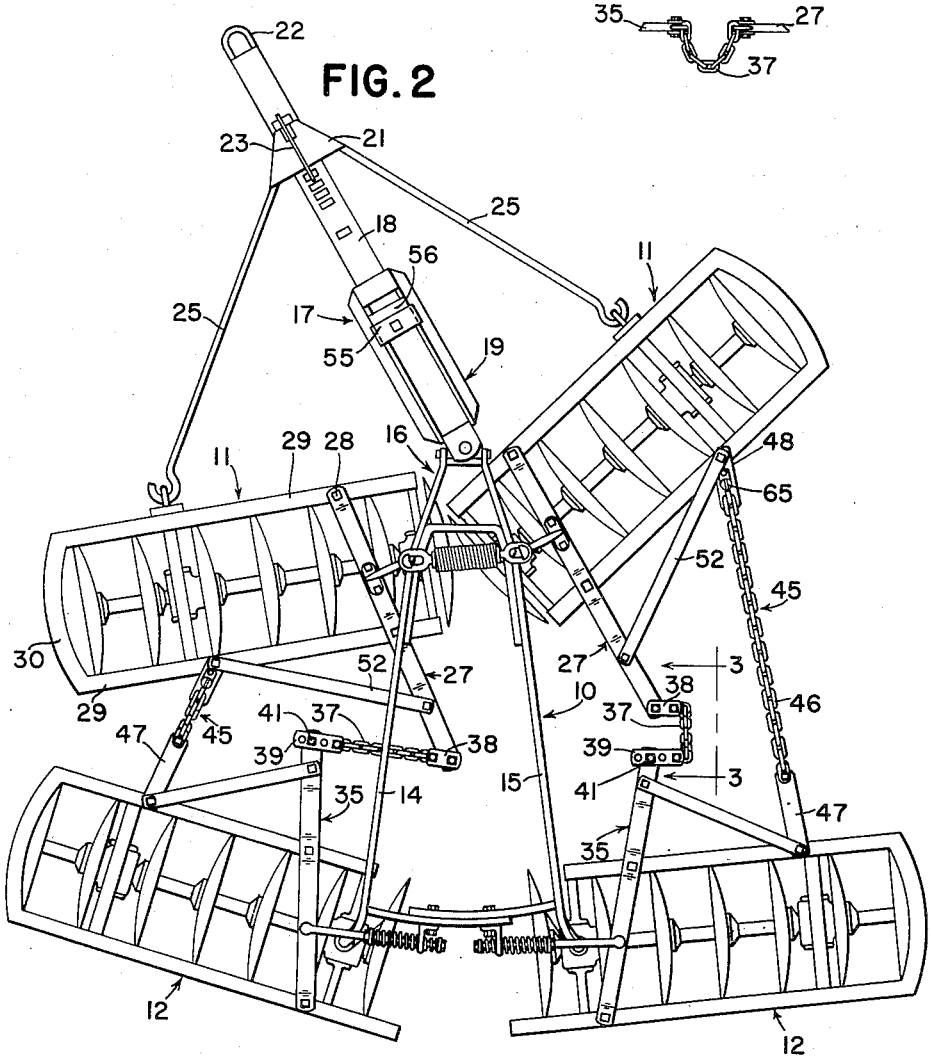
*INVENTORS*
WILLIAM P. OEHLER
CHARLES H. YOUNGBERG
BY
*ATTORNEYS*

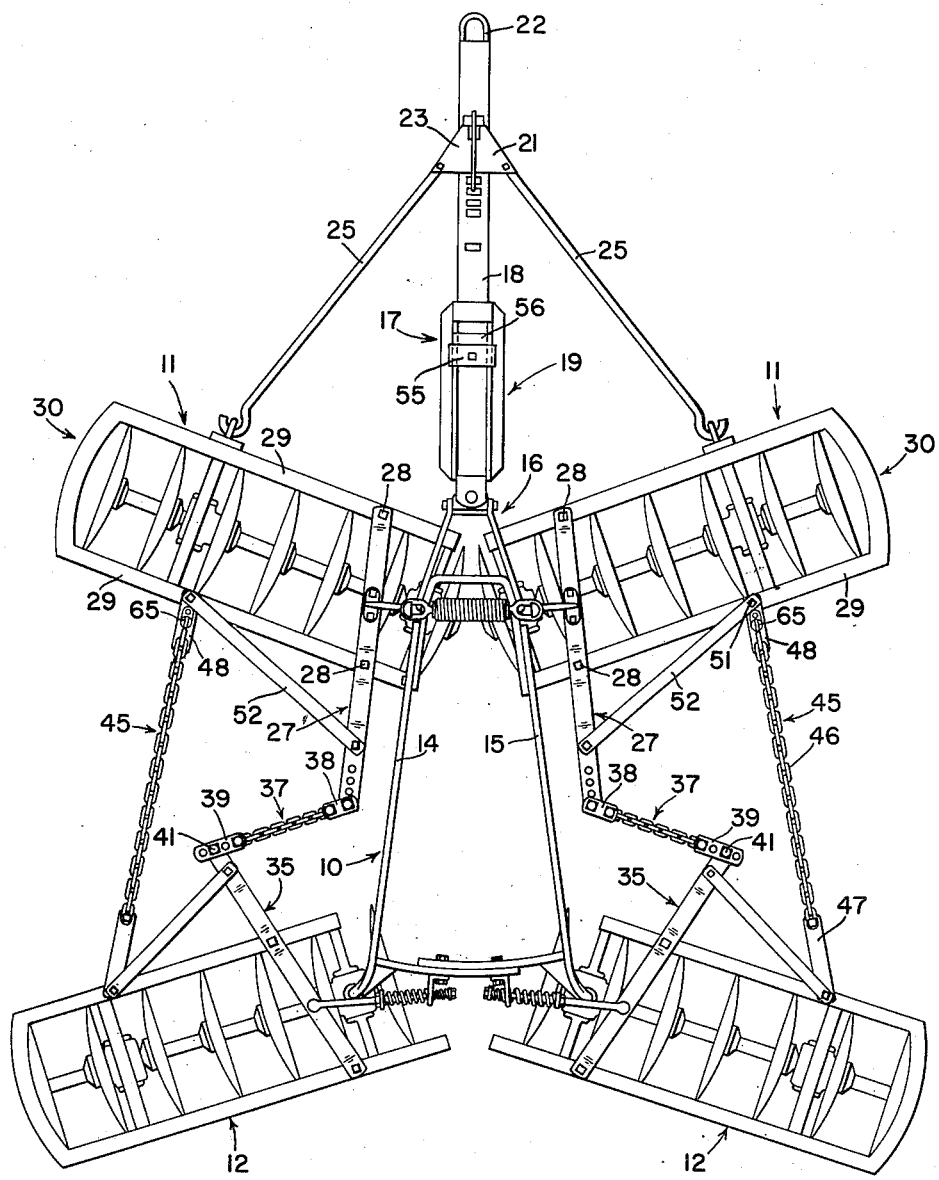

United States Patent Office 2,759,311
Patented Aug. 21, 1956

2,759,311
STABILIZING MEANS FOR DISK HARROWS

William P. Oehler and Charles H. Youngberg, Moline, Ill., assignors to Deere & Company, Moline, Ill., a corporation of Illinois Application December 1, 1953, Serial No. 395,493

3 Claims. (Cl. 55—81.5)

The present invention relates generally to agricultural implements and more particularly to disk harrows of the tandem or double-action type, including a pair of front gangs and a pair of rear gangs with suitable control means therefor.

The object and general nature of the present invention is the provision of new and improved stabilizing means adapted to be incorporated in a disk harrow of the type just mentioned whereby, in operation, the disks of the rear gangs are rigidly and positively held in the proper position to work soil between those portions of the ground that are worked by the disks of the front gangs. In harrows of the type to which the present invention particularly appertains, the inner ends of the front gangs and the inner ends of the rear gangs are each pivotally connected to means serving as a generally central frame, and to the forward portion of the frame there is a draft-transmitting drawbar that is adapted to swing laterally to facilitate turning the outfit with the disks in their working position, the drawbar being connected, for this purpose, with the outer ends of the front gangs and, through suitable connecting means, also with the rear gangs. It has been found, however, that under certain soil conditions the rear gangs do not always properly track with respect to the front gangs. It is to correct this situation and provide means that cooperates with the means connecting the laterally swingable drawbar with the rear gangs and positively holds the rear gangs in the proper relation with respect to the front gangs while yet permitting the harrow to be turned readily in either direction that the present invention has been developed. In other words, it is an important feature of this invention to provide stabilizing means for a double-acting disk harrow, in which the rear gangs are held in the proper position yet the ability of the harrow to be turned right or left, as desired, is not appreciably diminished, and no interference with right- or left-hand turns is present.

These and other objects and advantages of the present invention will be apparent to those skilled in the art after a consideration of the following detailed description, taken in conjunction with the accompanying drawings; in which:

Fig. 1 is a plan view showing a tandem or double-action disk harrow in which the principles of the present invention have been incorporated.

Fig. 2 is a plan view similar to Fig. 1 showing the harrow with the gangs and other parts in the positions they occupy when making a turn to the left.

Fig. 3 is a fragmentary view taken generally along the line 3—3 of Fig. 2.

Fig. 4 is a fragmentary view showing the manner in which the laterally outer stabilizing means may be adjusted so as to accommodate changes in the working angle of the disk gangs in operation.

Fig. 5 is a detail view showing one of the chain-retaining blocks associated with the outer end portion of each of the forward gangs.

Referring first to Fig. 1, the disk harrow in which the principles of the present invention have been incorporated is shown for purposes of illustration as including a main frame 10 to the forward portion of which a pair of front gangs 11 are pivotally connected at their inner ends for both horizontal and vertical swinging relative to the frame. Likewise, a pair of rear gangs 12 are pivotally connected at their inner ends for both vertical and lateral swinging with the rear portion of the frame 10. The latter includes side bars 14 and 15, the front ends of which are connected with a forward frame portion 16 to which the rear end of a drawbar construction 17 is pivotally connected, also for both vertical and lateral swinging. The drawbar construction comprises a forward section 18 and a rear section 19 that at its rear end is pivotally connected to the front portion 16 on the frame as described above. The front drawbar member 18, which may telescope relative to the rear section 19, is in the form of a channel along which a front slide 21 is movable. The front end of the channel 18 carries a clevis 22 or other attaching means by which the harrow is connected in draft-transmitting relation with a propelling tractor or the like. The movable slide 21 is adapted to be controllably latched in different positions to the drawbar member 18 by a latch structure 23 that is manually controlled, as by a cable or the like, as is conventional in a disk harrow of this type. The slide member 21 is connected by rearwardly and outwardly extending draft links 25 to the laterally outer portions of the front gangs 11.

The laterally inner portion of each of the front gangs carries an angling arm 27 that is made up of one or more bars rigidly secured, as at 28, to the angles 29 that make up the frames 30 of the gangs 11. The rear ends of the angling arms 27 extend rearwardly beyond the front gang frames 30 and are swingably connected to the forward ends of a pair of rear angling arms 35 that are secured to the gang frames of the rear gangs 12 in substantially the same manner as described above. Usually, as shown in U. S. Patent 2,339,124, issued January 11, 1944, to C. H. White, the connection between the rear end of each forward angling arm 27 and the front end of the rear angling arm 35 is in the nature of a rigid link capable of transmitting forces both in tension and in compression. However, according to the present invention, and in order to provide the desired stabilized action, such rigid links are replaced by flexible or collapsible means which will now be described.

According to the principles of the present invention, the aforesaid rigid link connection is replaced by a chain 37 that is connected at its laterally inner end to the rear end of the associated front angling arm 27, this connection includes a swivel 38 or the like. Two chains 37 are provided, as shown in Figs. 1 and 2, each extending from the rear end of the associated front angling arm to the forward end of the associated rear angling arm fixed to the rear gang frame. The laterally outer end of each of the connecting chains 37 is connected by an adjustable swivel 39 to the forward end of the associated rear angling arm 35. Specifically, each swivel 39 is pivotally connected by a bolt 41 to the forward end of the associated angling arm 35, and by taking out the bolts 41 and inserting them in other holes in the swivel 39, the effective length of the connecting members 37 may be adjusted, as desired, or as required by soil conditions where it may be necessary to have the rear gangs 12 operate at a working angle that is different from the working angle of the front gangs 11.

The connections so far described are such that in operation the rear end of the frame, and the rear gangs, may shift laterally a slight amount, and in such laterally displaced position, the disks of the rear gangs, under certain soil conditions, tend to run in the furrows formed by the disks of the front gang, rather than work the soil between the furrows formed by the disks of the front gangs which is the desired operation. In order to prevent this situation from developing, we extend a connecting member 45 from the laterally outer portion of each front gang directly to the laterally outer portion of the rear gangs, when the gangs are in their operating angles, as shown in Fig. 1. According to the present invention, this stabilizing connection 45 comprises a chain 46 at each side of the harrow, each chain being connected at its rear end through a strap member 47 with an adjacent portion of the associated rear gang. The forward end of each of the chains 46 is adjustably connected to a strap member 48 having a button-hole opening 49 in which a selected one of the links of the chain 46 may be engaged. The strap member 48, there being one at each side of the harrow, is connected with the associated gang frame in any suitable way, such as by the bolt 51 which connects the forward outer end of a brace member 52, to the front gang frame. The rear end of each brace member 52 is connected to the rear portion of the associated angling arm 27.

In operation, the slide 21 is latched in the selected opening in the drawbar 18 and then the outfit driven forwardly until the drawbar 18 slides forwardly the full amount relative to the rear drawbar member 19, this forward movement of the drawbar 18 being limited by a stop member 55 that is fixed to the rear end of the channel 18 and cooperates with a stop member 56 carried by the rear section 19 of the drawbar. This forward sliding of the drawbar section 18 relative to the section 19 acts through the links 25 to pull the front ends of the front gangs forwardly while the inner ends lag backwardly, due to the pressure of soil thereagainst. This swinging of the front gangs relative to the front gang 10 acts through the angling arms 27 to swing the rear ends of the latter arms laterally outwardly, and this movement of the angling arms 27 permits the outer ends of the rear gangs 12 to drop backwardly as the rear gangs pivot about their connections with the rear end of the main frame 10. The outer ends of the rear gangs can pivot in this manner only to the extent permitted by the chains 37 and stabilizing connections 45, the latter being adjusted in effective length so that the connections 45 are tightened when the operating position has been reached and at about the same time that the angling arm connecting chains 37 are tightened. Since the connections 43 extend directly from the front to the rear gangs, it will be seen that lateral displacement of the rear end of the frame, mentioned above as being one cause for the rear disks running in the furrows running in the front disks, is prevented. In other words, the chains 45 serve as stabilizing means maintaining the front and rear gangs in the proper relative positions so that the disks of the rear gangs operate in the soil between the portions acted on by the disks of the front gangs.

However, the stabilizing connections just mentioned do not interfere with turning of the outfit while the disks are in their operating position. Referring now to Fig. 2, which illustrates a turn to the left, it will be seen that when the drawbar 17 is swung to the left relative to the main frame 10, the outer end of the front gange at the right side of the harrow is pulled around forwardly, and this acts through the right-hand stabilizing connection 45 to also swing the outer end of the right-hand rear gang 12 forwardly, causing the front end of the right-hand angling arm 35 to approach the rear end of the front angling arm 27. This action would not be permited if the conventional rigid link were provided between the front and rear angling arms. However, as a feature of the present invention, the angling arm connecting member 37 is in the form of a collapsible chain 37 so that, as is illustrated in Fig. 3, when the left-hand turn is made and the right rear gang is pulled forwardly by the forward movement of the outer end of the front gang, the angling arms of the rear and front gangs can approach one another without interference, the chain 37 at the right side of the harrow merely going slack. It will, of course, be understood that the chain 37 represents any form of collapsible or other connection which is so constructed and arranged as to transmit forces in tension but incapable of transmitting forces in compression.

Still considering Fig. 2, and looking at the left side of the machine, it will be seen that as a result of leftward swinging of the drawbar 17, the rear end of the left-hand front gang 11 is forced rearwardly, and this acts through the left-hand front angling arm 27 to exert a pull through the chain 37 against the front end of the left-hand rear angling arm 35, which swings the left and rear gangs in a clockwise direction, causing the outer ends of the left-hand front and rear gangs to approach one another. While in normal operation, the left-hand chain 45 is tight, the member 45, being a chain that is collapsible or otherwise incapable of transmitting forces in compression, the aforesaid movement of the left-hand front gangs in approaching one another is permitted by the left-hand chain 45 (Fig. 2) going slack, much in the same manner as is illustrated in Fig. 3 for the right-hand angling arm chain 37. As will be seen from Fig. 1, each strap member 47 is at its rear end pivotally held between the brace member of the associated arm 35 and the adjacent part of the rear gang frame. Therefore, when the chain 46 is collapsed, as shown at the left portion of Fig. 2, the member 47 acts to hold the slack of the chain at such a forward point that the chain does not become entangled in the rear disks when making a turn. Again, it will be understood that the member 45 may take some form other than a chain, such as collapsible links or any other means capable of transmitting forces in tension but incapable of transmitting forces in compression.

Thus, we provide means in a disk harrow for stabilizing the operation of the implement and effectively holding the front and rear gangs in the proper position to insure that the rear disks operate in soil between the portions in which the disks of the front gangs operate, yet turning of the implement is not interfered with in any way.

Each strap member 48 carries a plug 65 that is adapted to enter the larger portion 50 of the opening 49. Each plug 65 has a finger hold 66 and an extension 67 apertured, as at 68, to receive a pivot pin 69 carried by the associated gang frame angle 29. A spring 71 releasably holds the plug 65 in chain holding position. The selected chain link is thus locked in the narrow slot of the buttonhole opening in the associated link 48.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim as our invention and desire to secure by Letters Patent is:

1. The combination with a double action disk harrow comprising a pair of front gangs, a pair of rear gangs, a main frame, means pivotally connecting the inner end portion of each gang to the frame means, a pair of rearwardly extending angling arms fixed at their forward portions to the laterally inner portions of the front gangs, a pair of forwardly extending angling arms fixed at their rear portions to the laterally inner portions of the rear gangs, and collapsible means connecting the rear end of each forward angling arm to the forward end of the associated rear angling arm, said frame and the rear gangs normally being swingable laterally relative to the front gangs, of collapsible means directly connecting the laterally outer end portion of each front gang to the laterally outer end of the associated rear gang for limiting the amount either rear gang may move rearwardly relative to the associated front gang.

2. A double action disk harrow comprising a pair of front gangs, a pair of rear gangs, a main frame, means pivotally connecting the inner end portion of each gang to the frame means, a drawbar pivoted to the front end of said frame for lateral swinging relative thereto, link means pivotally connecting the forward portion of the drawbar to the outer end portions of said front gangs, whereby lateral swinging of the drawbar serves to swing the outer ends of said gangs in a generally fore-and-aft direction, a pair of rearwardly extending angling arms fixed at their forward portions to the laterally inner portions of the front gangs, a pair of forwardly extending angling arms fixed at their rear portions to the laterally inner portions of the rear gangs, a longitudinally collapsible element connecting the rear end of each forward angling arm to the forward end of the associated rear angling arm, and a longitudinally collapsible element directly connecting the laterally outer end portion of each front gang to the laterally outer end of the associated rear gang for limiting the amount either rear gang may move rearwardly relative to the associated front gang, lateral swinging of said drawbar in one direction acting to swing the front gang at one side of the harrow and the associated rear gang on the same side of the harrow generally forwardly, the resulting movement of the forward end of the associated rear angling arm toward the rear end of the associated forward angling arm being accommodated by slack in the longitudinally collapsible element connecting the ends of said angling arms.

3. The invention set forth in claim 2, further characterized by said last mentioned longitudinally collapsible elements comprising chains and means in the form of a forwardly extending bar connecting the rear end of each of said chains to the associated rear gang, said bars acting to hold the collapsed portions of said chains forwardly of the disks of the rear gangs.

References Cited in the file of this patent

UNITED STATES PATENTS

| | | |
|---|---|---|
| 1,421,113 | Watters | June 27, 1922 |
| 1,506,595 | Lohmeyer | Aug. 26, 1924 |
| 1,655,712 | Reynolds | Jan. 10, 1929 |
| 2,339,124 | White | Jan. 11, 1944 |